(12) United States Patent
Baroncini et al.

(10) Patent No.: US 11,365,739 B2
(45) Date of Patent: Jun. 21, 2022

(54) MANAGEMENT AND CONTROL METHOD OF A PRESSURIZATION SYSTEM

(71) Applicant: CALPEDA S.p.A., Montorso Vicentino (IT)

(72) Inventors: Tiziana Baroncini, Vicenza (IT); Gianluca Marangon, Vicenza (IT); Alberto Marchetti, Camposampiero (IT); Ivan Menara, Breganze (IT)

(73) Assignee: CALPEDA S.P.A., Vicenza (IT)

( * ) Notice: Subject to any disclaimer, the term of this patent is extended or adjusted under 35 U.S.C. 154(b) by 36 days.

(21) Appl. No.: 16/903,000

(22) Filed: Jun. 16, 2020

(65) Prior Publication Data

US 2020/0400145 A1 Dec. 24, 2020

(30) Foreign Application Priority Data

Jun. 21, 2019 (IT) ........................ 102019000009747

(51) Int. Cl.
*F04D 15/00* (2006.01)
*F04D 13/06* (2006.01)

(52) U.S. Cl.
CPC ......... *F04D 15/0066* (2013.01); *F04D 13/06* (2013.01)

(58) Field of Classification Search
CPC .............................. F04D 13/06; F04D 15/0066
USPC ........................................................ 417/44.2
See application file for complete search history.

(56) References Cited

U.S. PATENT DOCUMENTS

| 7,797,062 | B2 | 9/2010 | Discenzo et al. |
| 8,417,483 | B2 | 4/2013 | Anderson et al. |
| 9,605,680 | B2* | 3/2017 | Stiles, Jr .............. F04D 15/0066 |
| 10,041,824 | B2 | 8/2018 | Skovmose Kallesoe |
| 2007/0154319 | A1* | 7/2007 | Stiles, Jr. .............. F04B 49/065 417/42 |

(Continued)

FOREIGN PATENT DOCUMENTS

| EP | 2910787 A1 * | 8/2015 | .............. F04B 49/08 |
| EP | 2910787 A1 | 8/2015 | |

(Continued)

OTHER PUBLICATIONS

International Search Report for IT 201900009747 dated Mar. 6, 2020.

*Primary Examiner* — Connor J Tremarche
(74) *Attorney, Agent, or Firm* — Cook Alex Ltd.

(57) ABSTRACT

A management and control method for at least one operation parameter of a pressurization system operated by an electric motor, the method comprising the steps of: detection of an operating pressure value at a delivery duct of the pressurization system, by means of a single pressure sensor; estimation of a hydraulic flow rate and a hydraulic head by means of an algorithm which is implemented in a control software based on the operating pressure value detected by means of the single pressure sensor; estimation of a motor rotation speed of the pressurization system based on the operating pressure value and on the number of blades of the impeller of said pressurization system as a result of said estimation; and processing of an on/off signal of the pressurization system. Also disclosed is a pressurization system, comprising a pressure value and a control electronic unit adapted to perform said method.

8 Claims, 6 Drawing Sheets

(56) References Cited

U.S. PATENT DOCUMENTS

| | | | | |
|---|---|---|---|---|
| 2009/0174267 A1* | 7/2009 | Bischof | ............... | F04D 25/0606 |
| | | | | 310/52 |
| 2010/0011869 A1* | 1/2010 | Klosinski | ................... | G01F 1/72 |
| | | | | 73/700 |
| 2012/0111114 A1* | 5/2012 | Emde | .................. | F04D 15/0088 |
| | | | | 73/579 |
| 2012/0326443 A1* | 12/2012 | Vince | ...................... | F03B 15/00 |
| | | | | 290/7 |
| 2014/0305201 A1* | 10/2014 | Watson | ................... | G01F 23/18 |
| | | | | 73/290 R |
| 2018/0335038 A1* | 11/2018 | Vestergaard Kragelund | ............... | |
| | | | | F04D 15/0066 |

FOREIGN PATENT DOCUMENTS

| | | |
|---|---|---|
| GB | 2 313 197 B | 11/1997 |
| WO | WO 2005/085772 A1 | 9/2005 |
| WO | WO 2014/023642 A1 | 2/2014 |

\* cited by examiner

MANAGEMENT AND CONTROL METHOD OF A PRESSURIZATION SYSTEM

CROSS-REFERENCE TO RELATED APPLICATION

This application claims priority to Italian Patent Application No. 102019000009747, filed Jun. 21, 2019, which is hereby incorporated by reference herein in its entirety.

BACKGROUND OF THE INVENTION

Field of Application

The present invention relates to a management and control method for at least one operation parameter of a pressurization system, operated by means of an electric motor.

The above method finds useful application in particular, but not exclusively, in the field of pumps and of pressurization units equipped with fixed or variable-speed electric motors, in particular the electric motors of the asynchronous type.

Prior Art

It is known, in the present field, that in water supply networks where the network pressure is not sufficient or sufficiently stable to supply water to consumers who are at a high level, pressure-increase devices, commonly known as "booster pumps", are adopted. Generally, at least one main pressurization system and at least one auxiliary pressurization system are provided.

These pressure-increase devices are typically designed in such a way that a required pressure level at the delivery of the pressure-increase device may be kept within a certain range of values. As a result, the pumps are sized in such a way that, assuming a defined inlet pressure, they keep the system pressure between a lower and an upper limit value. To this end, the booster pumps always switch on when the pressure level on the outlet side of the pressure-increase device drops below the lower limit value and switch off again when the upper limit value is reached. If the inlet pressure of the auxiliary pumps drops to a value that does not allow this lower limit value to be reached, the pressure-increase devices continue to operate unlimitedly at the maximum pump power, resulting in a correspondingly high energy consumption, pump wear and heating of the delivered medium, without at the same time obtaining the desired effect as regards the pressure level. In particular, the component that is most prone to damage for a continuous start-stop operation, particularly in pumps operated with an asynchronous motor, is the condenser.

To overcome this drawback, a tank, also called expansion tank, is generally adopted inside the hydraulic circuit, in order to keep the number of switching-on and switching-off of the generic pressurization system as low as possible. It is common practice to contain it within thirty switching-on/off per hour. However, this expedient is often not enough.

Nowadays, therefore, methods and systems have been developed for measuring the flow rate in order to determine the correct operating pressure values and to establish optimal service conditions for the utility. Such an estimation is, in particular, necessary for the case of pumps operated by an asynchronous motor.

WO 2014/023642 A1 patent application describes a method of mathematical estimation of the flow rate of a pressurization system, in particular a centrifugal pump, which uses the rotation speed values of the pump, of a hydraulic variable of the pump, typically the delivery pressure, and one of electric variable of the motor drive, e.g. electrical power.

WO 2005/085772 A1 patent application describes a method for measuring the flow rate of a pressurization system operated by an alternating current motor, whose rotation speed is controlled by a frequency converter. The flow rate is determined by using characteristic data of the pressurization system and measured parameters such as for instance the motor rotation speed of the pressurization system, the liquid pressure and the motor power.

GB 2 313 197 B patent describes an estimation method of the flow rate of a pressurization system by comparing the testing data provided by the manufacturer of the pressurization system, in this case the power absorbed by the pump of the pressurization unit, the capacities and hydraulic heads with the same quantities measured in the operating conditions. Two pressure transducers are used to determine the hydraulic head H in the operating conditions, the first one in suction and the second one in delivery of the pressurization system.

Although advantageous and alternative to the use of expensive flow rate sensors, the currently known methods provide for the adoption of a plurality of measuring tools, with greater complexity and cost of the overall system.

Furthermore, the adoption of a plurality of measuring systems may lead to different possible measurement errors, which may be combined and amplified in the overall estimation of the flow rate.

For this reason an object of the present invention is to conceive a management and control method of a pressurization system that allows obtaining a confident flow rate value while minimizing the parameters necessary for this estimation.

A further object is to provide a method able to monitor the operating conditions of a pressurization system in order to optimize the operation thereof in the various steps of a time period.

Another object is to provide a method that allows obtaining an optimization of energy consumption, while keeping the maximum use comfort for the utility.

Finally, a further object is to provide a method that minimizes the structural requirements of the system in order to contain the costs.

SUMMARY OF THE INVENTION

The solution idea underlying the present invention is to provide a method that allows determining and optimizing the operating status of a pressurization system by an estimation of the flow rate starting from a minimum number of measured quantities.

The above technical problem is solved by a management and control method for at least one operation parameter of a pressurization system, or pump, operated by an electric motor, said method comprising a step of detecting an operating pressure value at a delivery duct of the pressurization system, by a single pressure sensor. The method then comprises a step of estimation of a hydraulic flow rate and a hydraulic head by means of an algorithm which is implemented in a control software based on the operating pressure value detected by means of the single pressure sensor. The method further comprises a step of estimation of the motor rotation speed of the pressurization system, based on the operating pressure value and on the number of blades of the propeller of the pressurization system. Finally, the method comprises a processing step of an on/off signal of the pressurization system as a result of said estimation.

Advantageously, the present invention allows, by a single integrated physical pressure sensor in the delivery duct of the pressurization unit and by an algorithm implemented in the control software, the estimation of the hydraulic flow rate, of the motor rotation speed of the pressurization system and of the requested expansion tank capacity. It is thus possible to adjust the operating minimum and maximum pressure thresholds of the pressurization system and to monitor the service conditions that are close to the closing/opening of a utility connected to the hydraulic circuit of the pressurization system. In this way maximum use comfort is guaranteed to the user.

Preferably, the method of the present invention comprises a preliminary step of storing the nominal operation parameters of the pressurization system in a portion of the memory of a control electronic unit of the pressurization system, or pump.

Advantageously the pressurization system is therefore provided with a series of test data, acquired and stored during the testing step in the production line, specific for each model of pump and/or pressurization unit produced.

Still preferably, the signal processing step comprises a step of updating the nominal hydraulic head value of the nominal operation parameters of the pressurization system, starting from said operating pressure value and from said motor rotation speed in the operating conditions once installed in the pressurization system. In this way it is possible to update the data based on the specific functional application requested in the utility.

Additionally, and preferably, the processing step of a signal comprises a step of calculating an optimal value of input and suction hydraulic head of said pressurization system, within a range of reference values.

In this way, advantageously, there is an optimal supply for the user in all conditions and at any time during a use time period.

Still preferably, the processing step of a signal comprises a step of calculating a pressure variation between the input hydraulic head and the nominal hydraulic head and a related optimization of a switching-on time of the pressurization system as a function of the on/off signal.

Advantageously, this allows a correct switching-on timing of the pressurization system, so as to decrease the energy consumption and to increase the reliability of the pump components subjected to wear and tear due to unnecessary switching-on and switching-off for the correct water supply of the pressurization system.

According to a preferred embodiment, the step of calculating an optimal value of input hydraulic head of the pressurization system is carried out by the steps of: setting of initial pressure parameters of the pressurization system, calibration of the pressurization system by means of an iterative process of comparison between a weighted difference in operating hydraulic head and a pre-set reference value and identification of a value of the reference input and suction hydraulic head and of the one minimum energy consumption condition in a pre-set time period.

Advantageously, the present procedure is the fastest and at the same time effective to achieve the optimal condition for the utility both from an operational and energy consumption point of view.

Preferably, an iterative repetition is provided for a variable energy optimization of the operation of said pressurization system and for the identification of off-project operating conditions of said pressurization system.

Advantageously, this allows achieving a condition of maximum efficiency for different moments in a time period. Furthermore, this allows identifying, by indirect evaluation of the flow rate, the approaching condition of tap closing, as well as identifying small permitted drips. In fact, these drips imply variations in the slope of the flow rate operating curve but must not correspond to a response of the pressurization system. This allows further reducing an unnecessary number of switching-on and switching-off of the pressurization system.

Still preferably, the method provides for the application of a pre-set comfort parameter to the values of nominal hydraulic head and of inlet and suction hydraulic head.

Advantageously, this allows a correction of the values to further improve the supply for the utility.

According to a particular embodiment, the management and control method of the invention comprises a priming control step of the pressurization system.

Advantageously, this additional step allows a prevention check that confirms the correct operation or identifies the need for a maintenance intervention under self-diagnosis conditions. In this way, intervention times for maintenance are optimized and even more serious damage is prevented.

Still preferably, the management and control method comprises an estimation step of the volumetric capacity of an expansion tank according to the operating use conditions of the pressurization system adapted to maintain a pre-set minimum operating threshold of switching on and switching off of the above pressurization system.

Advantageously, this also allows optimizing the interfacing to the water distribution system by suggesting to the plumber the minimum size of an external expansion tank to be integrated into the system.

According to another aspect of the invention, a pressurization system is provided, which comprises a single pressure sensor and a control electronic unit adapted to perform a method according to what has been defined.

Advantageously, a pressurization system thus structured allows operating, with a minimum number of physical components, in an optimal configuration from the point of view of minimizing consumption and of the correct and lasting operation of the components, in particular of the electrolytic capacitor.

According to an embodiment, the pressurization system comprises an electric motor of the asynchronous type.

According to a further preferred embodiment, the pressurization system comprises an expansion tank.

Further features and advantages will become more apparent from the following detailed description of a preferred, but not exclusive, embodiment of the present invention, with reference to the enclosed figures given by way of non-limiting example.

DETAILED DESCRIPTION

Figure 1:
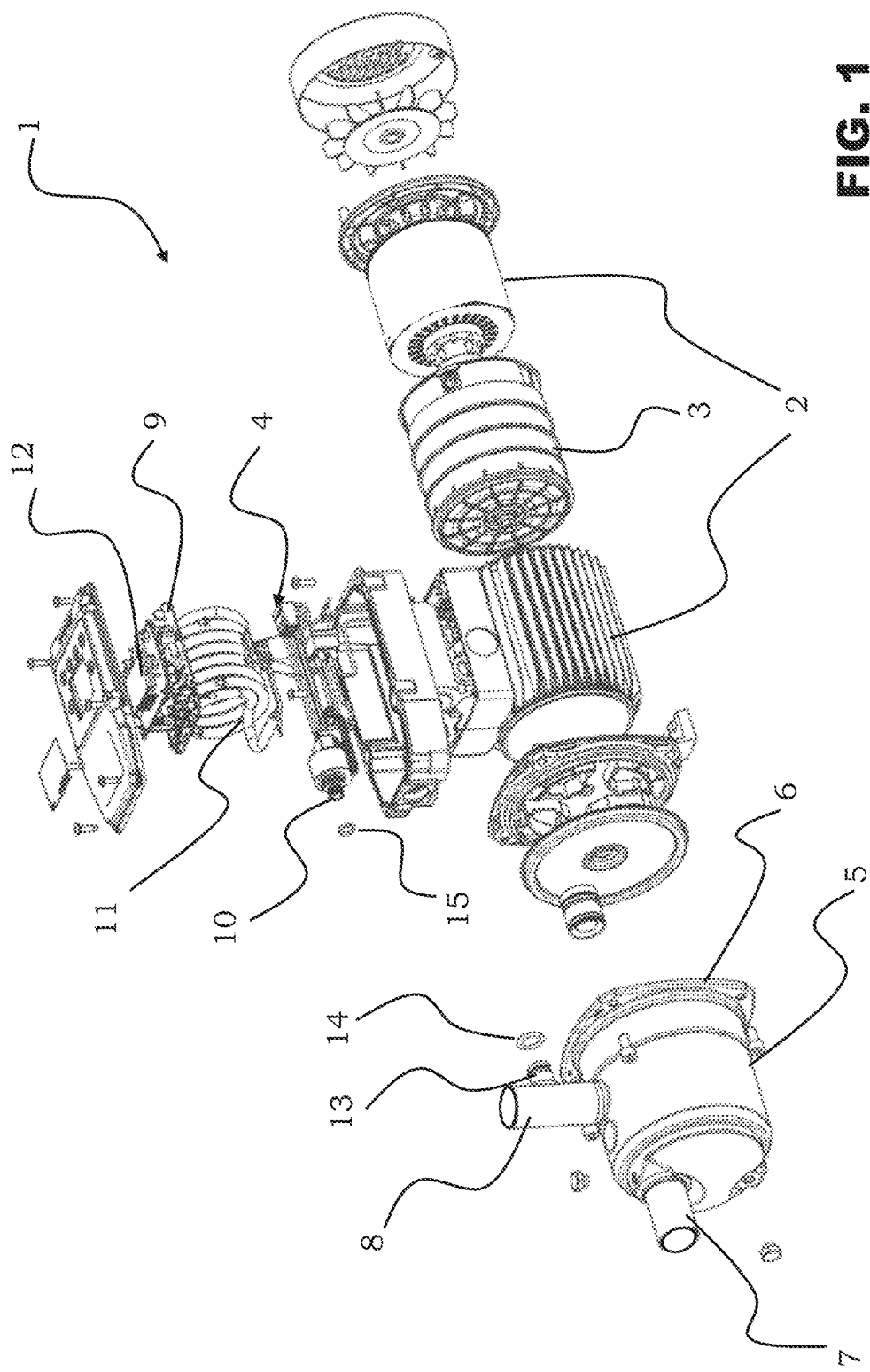
FIG. 1 represents an exemplifying pressurization system according to the invention.

With reference to the figures, reference number 1 globally and schematically indicates a pressurization system made according to the present invention.

The pressurization system 1 comprises an electric motor 2, a hydraulic unit 3 and a control electronic unit 4.

Electric motor 2 and hydraulic unit 3 are kinematically coupled by means of a motor shaft.

The electric motor 2 is preferably of the two-phase asynchronous type.

The hydraulic unit 3 is received into a volute 5, through an open side 6 of the volute 5.

From the volute 5 a liquid suction duct 7 and a liquid delivery duct 8 depart, which are internally threaded for coupling with the supply and distribution pipes (not shown) of the hydraulic system on which the pressurization system 1 of the present invention is inserted.

The electric motor 2, in the exemplifying embodiment of FIG. 1, is laterally coupled to the control electronic unit 4. The control electronic unit 4 comprises a control electronic board 9 and an interface display 12. The electronic unit 4 further comprises a pressure sensor 10, connected to the control electronic board 9 by means of a connection cable 11. The pressure sensor 10 is adapted to detect the liquid pressure inside the liquid delivery duct 8, and thus to adjust the start/stop cycles of the pressurization system 1.

In particular, on the side surface of the liquid delivery duct 8 a support element 13, transversal to the axis of the liquid delivery duct 8 and adapted to receive the pressure sensor 10, is provided. The pressure sensor 10 is removably constrained, for instance by screwing, to the support element 13.

A seal element 14, represented in the present embodiment by way of example by an O-ring, is interposed between the electronic unit 4 and the pressure sensor 10. Said seal element 14 performs a retainment and support function by compensating for any misalignments between the volute 5 and the electric motor 2.

A further seal element 15 is interposed between the support element 13 and the pressure sensor 10 to ensure the correct hydraulic seal between the components.

The electronic unit 4 is adapted to manage and control at least one operating parameter of the pressurization system 1.

During the testing step of the pressurization system 1 there is a preliminary step of storing the nominal operation parameters of the pressurization system. In particular, the hydraulic and electric operation parameters of the pressurization system 1 are acquired. The pressure Hin of the fluid at the suction duct 7 of the pressurization system 1 is known. The pressure at the delivery duct 8 is measured by means of the pressure sensor 10. The power Pn absorbed by the motor and the number of revolutions RPMn of the electric motor 2 are known, the latter being indirectly obtained from the delivery pressure pulsations of the pressurization system, in particular a centrifugal pump, the number of blades Z of the impeller are known, with appropriate low-pass electronic filtering. The fluid flow rate Qn is obtained as a function of the absorbed power Pn and the number of revolutions RPMn. It is possible to determine the absolute nominal pressure Hn measured by the pressure sensor 10 as a function of the liquid flow rate Qn and of the number of revolutions RPMn. With Hn and Hin known, it is therefore possible to determine the hydraulic head ΔP of the pressurization system 1 in test bench conditions such as Hn-Hin.

These parameters are transferred into the memory of the electronic unit 4.

In the step of real operation in the utility, the corresponding hydraulic head value ΔP must be obtained. The value of absolute nominal pressure Hn must be updated according to the particular application case. For this reason, the flow rate in the operating conditions Qf, the pressure Hf measured by the pressure sensor 10 at the delivery duct 8 in the operating condition must be known. The number of revolutions RPMf in the operating condition can be further obtained, analogously to what has been done previously, i.e. from the pressure pulsations in the delivery of the pressurization system, in particular the centrifugal pump, the known number of blades Z of the impeller, with appropriate low-pass electronic filtering as a function of the above parameters and of the parameters stored in the electronic unit 4.

Starting from the operating parameters, in particular the absorbed power Pf and the parameters stored in the electronic unit 4, the absorbed power may then be calculated in nominal calibration conditions of the pressurization system, according to the mechanical similarity of turbomachinery, such as $$P_n = P_f * \left(\frac{RPM_n}{RPM_f}\right)^3$$

Analogously, the flow rate in real operating conditions may be calculated:

$$Q_f = Q_n * \left(\frac{RPM_f}{RPM_n}\right)$$

Then the updated absolute nominal pressure Hn may be calculated for the application case starting from the one calculated in the operating step:

$$H_n = H_f * \left(\frac{RPM_n}{RPM_f}\right)^2$$

In real conditions of installation of the pressurization system, the suction pressure Hinf is not always constant, for instance when connected to the local water network or to pressurization systems on local water networks.

It is, however, essential, as described above, to know the effective value of the pressure Hinf for calculating the hydraulic head of the pressurization system ΔPf.

The present invention provides for a calibration step to obtain this pressure Hin.

First of all, a phase of setting parameters F1 is performed. The parameters set are the nominal absolute pressure Hmaxnom measured by the pressure sensor 10, the nominal absolute pressure measured in the operating condition Hmaxf by the pressure sensor 10 in conditions of zero flow rate Q, the nominal absolute pressure Hinnom in suction, the nominal absolute pressure in operation Hinf in suction in conditions of zero flow rate Q, the power absorbed by the motor Pmaxnom, the power absorbed by the motor in the operation step Pmaxf. The hydraulic head in the operating conditions ΔPf corresponds to the difference Hmaxnom-Hinnom.

They are set as initial reference parameters: Hmaxr=Hmaxnom, Pmaxr=Pmaxnom, Hinr=Hinnom.

A reference value is further set for the correction of the set reference parameters.

A weighted comparison is therefore carried out between the operating parameters in conditions of zero flow rate Q with respect to the set reference parameters and this reference value.

In particular, if the ratio $$\frac{(H_{maxf} - H_{maxr})}{H_{maxr}}$$

is less than or equal to this reference value, then Hinfr=Hinnom is set as reference operating input pressure and no correction of the flow rate value is applied in the operating conditions Qf. The hydraulic head value ΔPf=Hn−Hinfr is thus obtained.

Instead, if the ratio $$\frac{(H_{maxf} - H_{maxr})}{H_{maxr}}$$

is greater than this reference value, the detected value of nominal absolute pressure measured in the operating conditions Hmaxf by the pressure sensor 10 in the conditions of zero flow rate Q is set as new reference parameter Hmaxr, therefore Hmaxr=Hmaxf, and the reference operating input pressure value Hinfr is corrected as Hmaxr-Hmaxnom. The reference values Hmaxr and Hinfr are therefore adopted as the switching-on and switching-off values of the pressurization system 1.

The absorbed maximum power value is always equal to Pmaxnom, and we proceed according to the mechanical similitude formulas of the turbomachines for the calculation of ΔPf and Qf with the new value Hinfr.

After this weighted comparison, the calibration step is stopped.

As stated, if the pressurization system 1 is installed to increase the pressure of the public water network, the Hinfr is variable. This may lead to an oversized number of switching-on and switching-off of the pressurization system 1. Furthermore, especially in the time slots most used by the utility, pressure fluctuations occur, and consequently the pressurization system is not able to guarantee the requested supply at higher heights, for example for the upper floors of the condominiums, due to system pressure drops, with an intermittent supply.

Consequently, the present invention provides a self-adaptive procedure downstream of the calibration step.

Once the parameters Hinfnom and Hmaxnom have been set, generally but not limitedly comprised between 2 bar and 4 bar, and once the described calibration step has been carried out to obtain the reference values Hmaxr and Hinfr, the pressurization system 1 is operated in standard use conditions by the utility. Therefore, the characteristic parameters Hinfr and Hmaxr are recorded for a pre-set time period.

At this point, a so-called "eco" mode may be set, such that the electronic unit 4 controls the pressurization system 1 to optimize, in particular, the number of switching-on and switching-off of the pressurization system 1 in the reference time period, thus optimizing the energy consumption.

The average values Hmaxr and Hinfr are set as new operating limits until the condition of Hmaxf greater than Hmaxr occurs, at which the pressurization system 1 switches off.

The calibration step will then be repeated after the switching off. If it is found that the maximum absorbed power at the switching-off pressure is different from Pmaxnom, a variation of the suction conditions, and in particular of Hinfr, is associated and the calibration step is repeated even if the pressurization system has been switched off at a pressure lower than Hmaxr.

Differently, a so-called "comfort" mode may be set, such that the electronic unit 4 controls the pressurization system 1 to minimize the pressure fluctuations during the water supply to the utility.

In this case, once determined the average value ΔPmed between the average values Hmaxr e Hinfr, they are determined and stored in memory to the electronic unit 4 as nominal values:

$$H_{infnom} = H_{inf}(\text{medio}) + \varepsilon * \Delta P_{med}$$

$$H_{maxnom} = H_{maxr}(\text{medio}) - \varepsilon * \Delta P_{med}$$

with ε equal to a predefined constant that is preferably comprised between 0.05 and 0.15.

Figure 2:
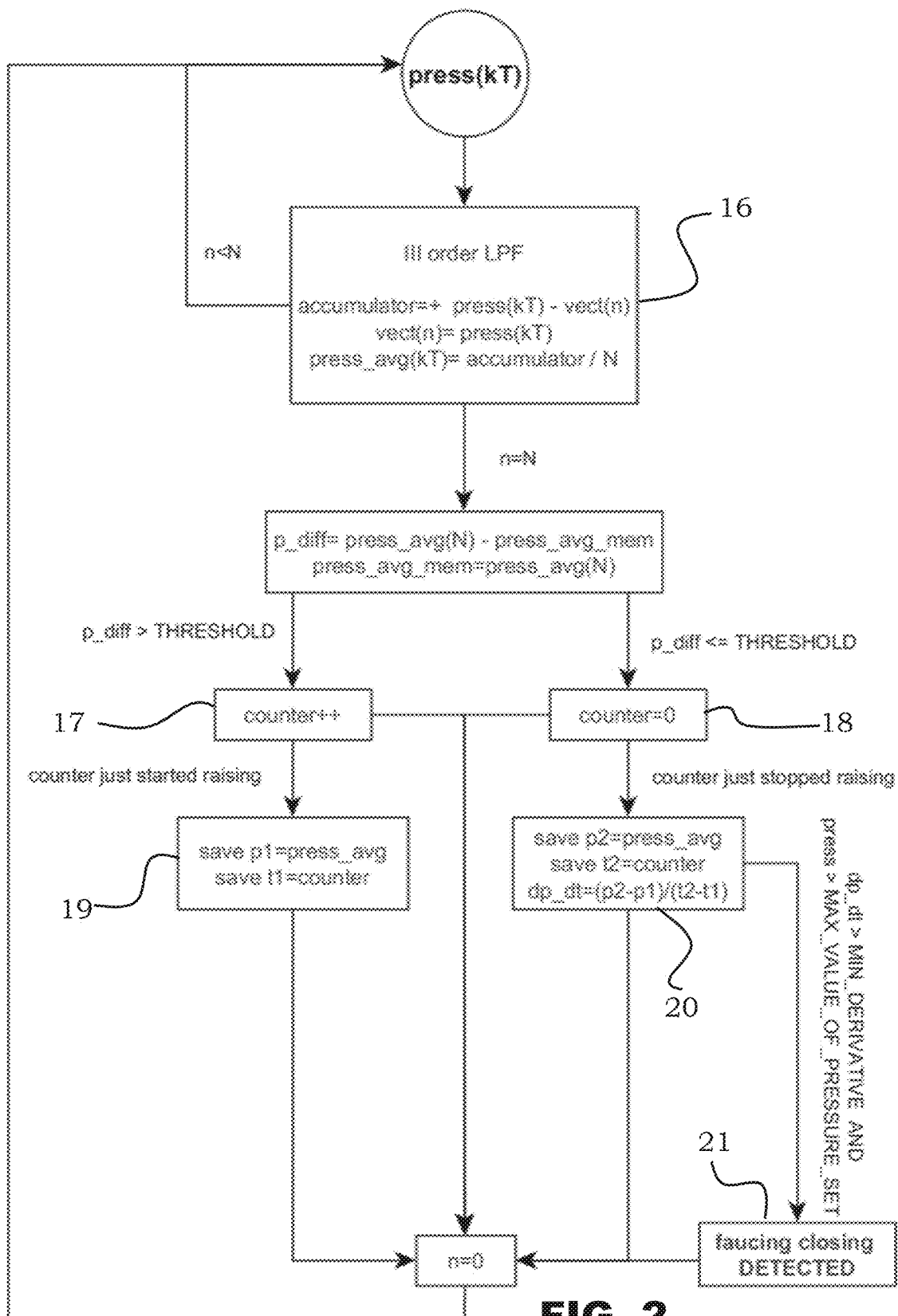
FIG. 2 represents an exemplifying flow chart according to the invention.

The method according to the invention further provides a combination algorithm that allows optimizing in a coordinated way the requirements of minimum switching-on time and maximum supply stability, schematized in FIG. 2. In particular, it is provided to increase the minimum switching-on time of the pressurization system in the "comfort" mode meanwhile reducing the switching-off/switching-on frequency of the pressurization system 1 in the unit of time, therefore switching off the latter when it is certain that the utility's request has stopped.

This algorithm is based on the identification of a sufficiently rapid positive pressure variation, which exceeds a pre-set pressure value, which acts as a threshold, and which therefore heralds the utility closing condition. The algorithm uses the manufacturing data of the pressurization system 1, in particular, the characteristic curve Q/H that links the flow rate and hydraulic head of the pressurization system 1 itself.

Specifically, the present invention provides for an acquisition step 16 of a signal that is filtered and averaged through a moving average algorithm on a number N of samples, preferably equal to 1024 samples, and with a sampling time Tc, preferably equal to 200 µs. The signal acquisition 16 is therefore iteratively repeated, and after N acquisitions the average pressure value obtained is compared with that of the previous period.

If this difference exceeds the threshold, there is an increase 17 of a counter, otherwise there is a reset 18 of the same counter.

As soon as the counter increases, there is a step of first storage 19 of a so-called "state 1" with the pressure value associated with the acquisition time (P1, t1). As soon as the counter resets, namely the pressure difference no longer exceeds the threshold, there is a second storage step 20 of a so-called "state 2" with the pressure value associated with the acquisition time (P2, t2). The derivative between "state 1" and "state 2" is then calculated and if this is greater than a minimum value, the method signals the closure 21 of the utility.

The threshold value for the counter increase is obtained from the Q/H characteristic curve of the pressurization system. A minimum derivative value is also determined, to skim the slow pressure variations.

For these determinations, the difference Δp is considered between the pressure of the pressurization system 1 in conditions of zero flow rate Q and the pressure of the pressurization system 1 in conditions of flow rate Q equal to 0.5 m³/h, corresponding to about 8 l/min.

The threshold and minimum derivative values are therefore determined considering the comfort parameter ε:

$$\text{THRESHOLD} = \Delta p \varepsilon$$

$$\text{DERIVATIVE} = \frac{\Delta p}{T_c N} 2\varepsilon$$

A value of c of about 0.125 is preferable.

According to a preferred aspect of the method according to the invention, the above method is further adopted for a priming control step during the start-up of the pressurization system 1.

In particular, during this start-up step, the electronic unit 4 monitors the derivative before the power absorbed by the motor and verifies that this is increasing in a time interval Δt chosen as a function of the model, or pump, of pressurization system 1.

At the same time, the above-described algorithm is applied for the detection of a minimum flow rate at the delivery duct 8 of the pressurization system to verify if a minimum flow rate Qmin also typical of the model, or pump, of the pressurization system 1 is exceeded.

If in the considered time interval Δt the above conditions occur simultaneously, the pressurization system is primed and follows a standard operation. Differently, if both of these conditions are not verified, the pressurization system is stopped and the start-up procedure repeated for a predetermined number n of times, also typical of the model of the pressurization system 1. If after the pre-set number of start-ups the conditions are not verified, the pressurization system 1 goes into an alarm state and definitively stops, requesting the intervention of an external operator.

The values Δt, Qmin and n are implemented in specific reference tables.

The method according to the invention may provide, according to a preferred aspect, that the pressurization system 1 is equipped with a storage tank, also called expansion tank that activates when a preset operating threshold is reached.

The need to have an accumulation system derives from the possibility of supplying water at a constant flow rate in response to the utility requests during the day.

The capacity of a storage tank must be such as to ensure the water needed during the periods of maximum demand and to contain the same when the flow rate required by the utilities is lower than the average flow rate supplied.

Figure 3:
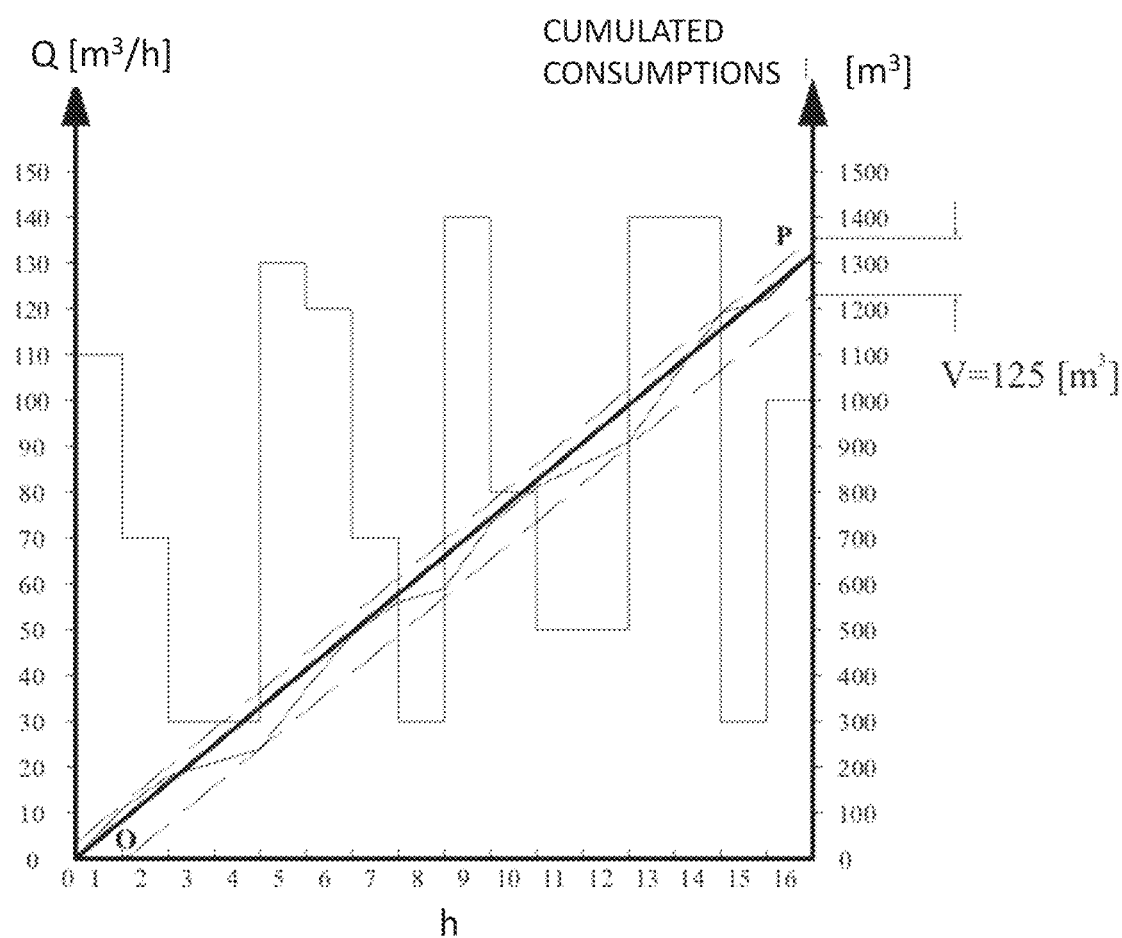
FIG. 3 represents a selection chart of an expansion tank for a pressurization system according to the invention.

Once the flow rates and the hourly consumption have been defined, they can be plotted against time to determine the minimum capacity of an expansion tank, as shown by way of example in FIG. 3.

Specifically, once the extreme points of the integral curve, 0 and P, have been identified, the joining of these points and two parallels thereto are drawn, which are carried out for the points of the integral curve that are furthest from the segment O that connects points 0 and P. The vertical segment intercepted by the two parallels identifies, in the scale of the integral curve, the minimum capacity V of the expansion tank in the event that a flow rate equal to the average daily consumption is supplied.

For instance, an autoclave may be adopted as expansion tank, with respect to which the cycle time, the capacity, in particular, with the adoption of a pressurization air compressor of the system, and the maximum insertion frequency may be obtained by means of known analysis.

Figure 4:
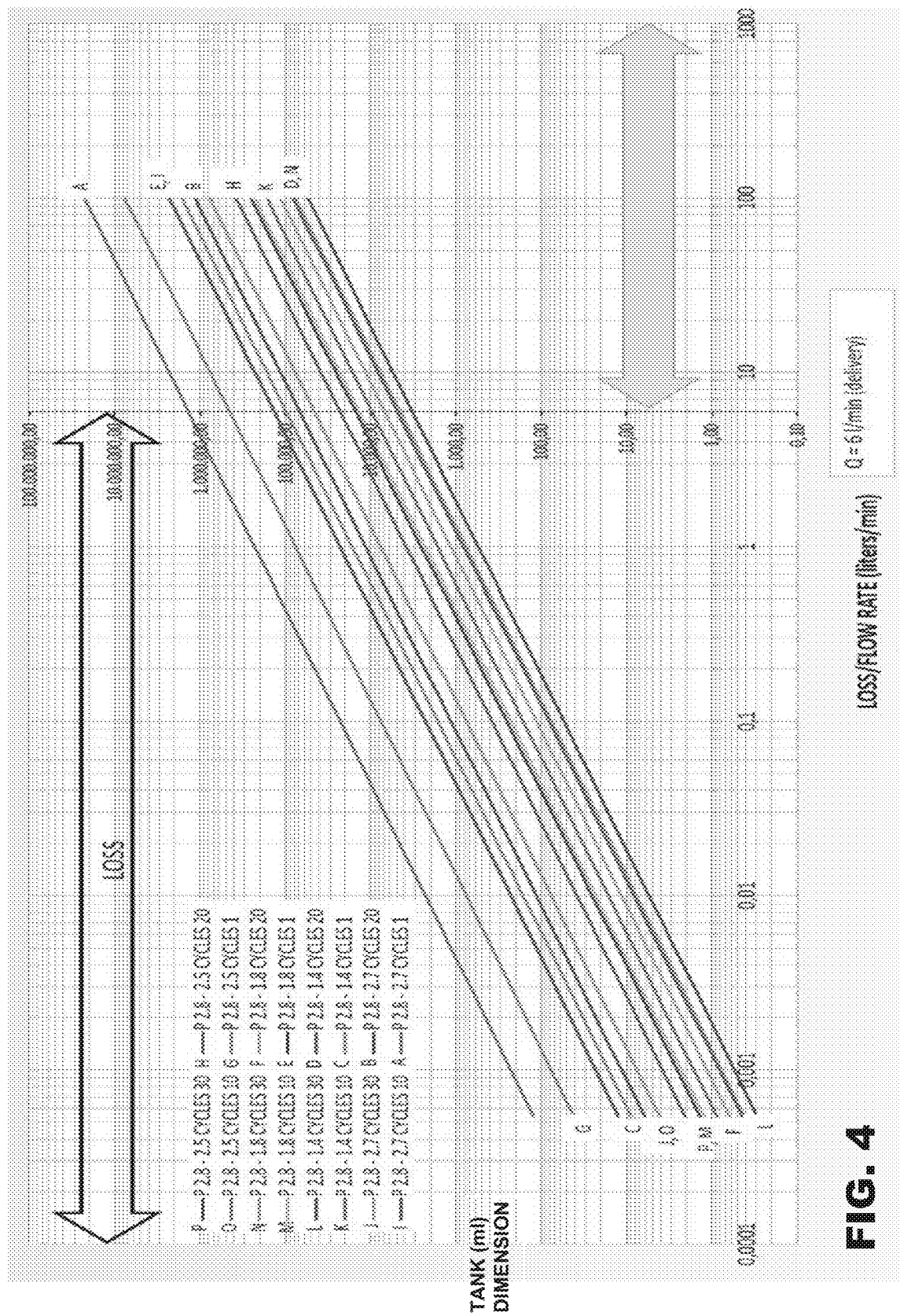
FIG. 4 represents a further selection chart of an expansion tank according to the invention.

The size of the expansion tank can be defined according to the Q/H characteristic of the pressurization system, as shown by way of example in FIG. 4.

The method according to the invention thus provides for the evaluation of the loss or supply conditions of the water network downstream of the pressurization system 1 by establishing a flow rate limit between the conditions highlighted in FIG. 4, which identify a boundary value between "loss" and "useful flow rate delivered to the utility", equal to Q=6 l/min in the example shown. Each straight line is a function of the pressurization system hysteresis, the maximum number of start-ups and hourly cycles of the pressurization system 1 and the type of expansion tank adopted. Given a flow rate value and the mentioned fixed limits, it is possible to obtain a minimum capacity value of the expansion tank. Once connected with the pressurization system 1, it is possible to read on the interface display 12 the estimated value of the flow rate, the pressure measured by the pressure sensor 10 and the electrical parameters of the electric motor 2.

Figure 5A:
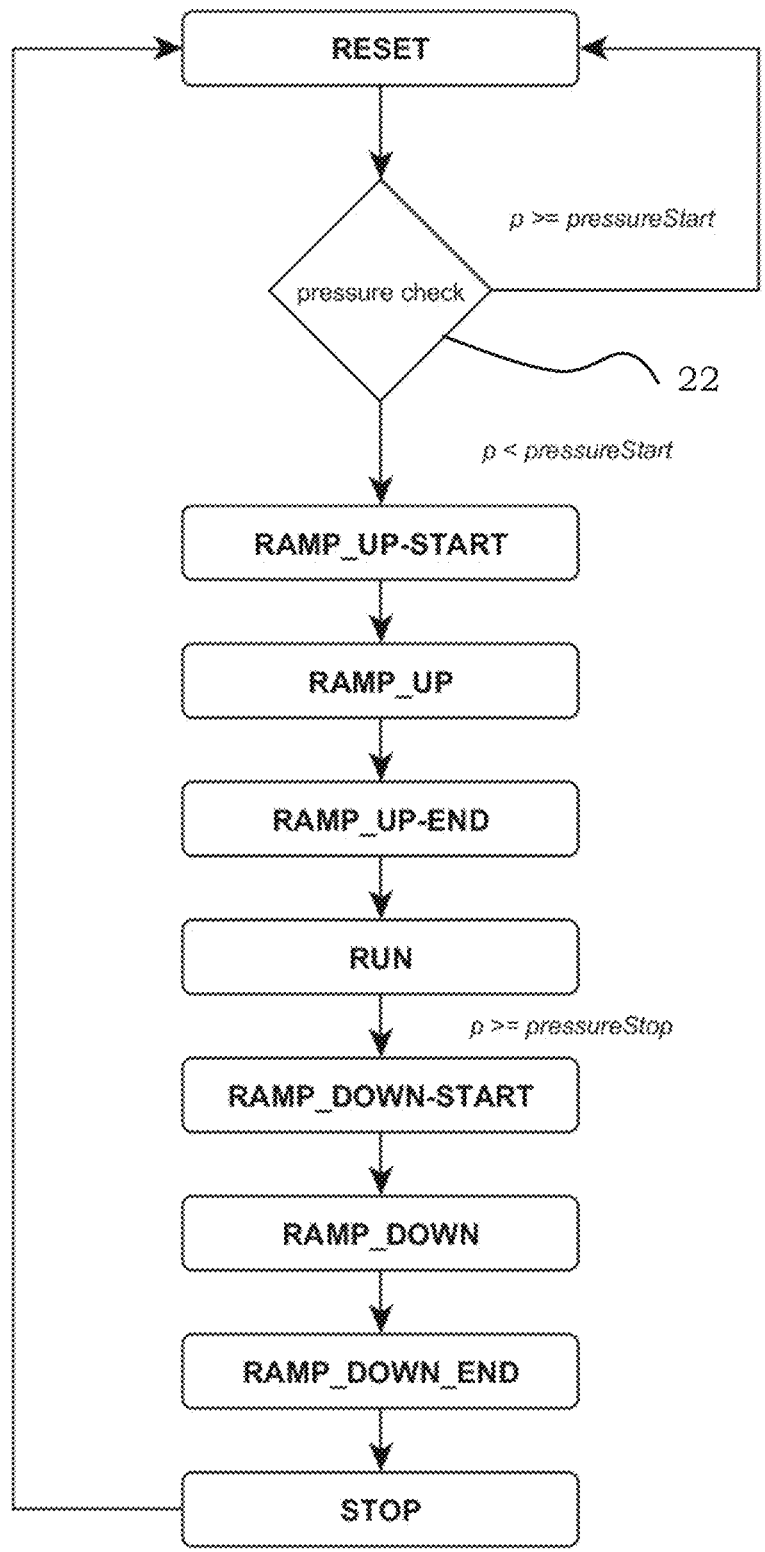
FIGS. 5A and 5B represent further exemplifying flow charts according to the invention.
Figure 5B:
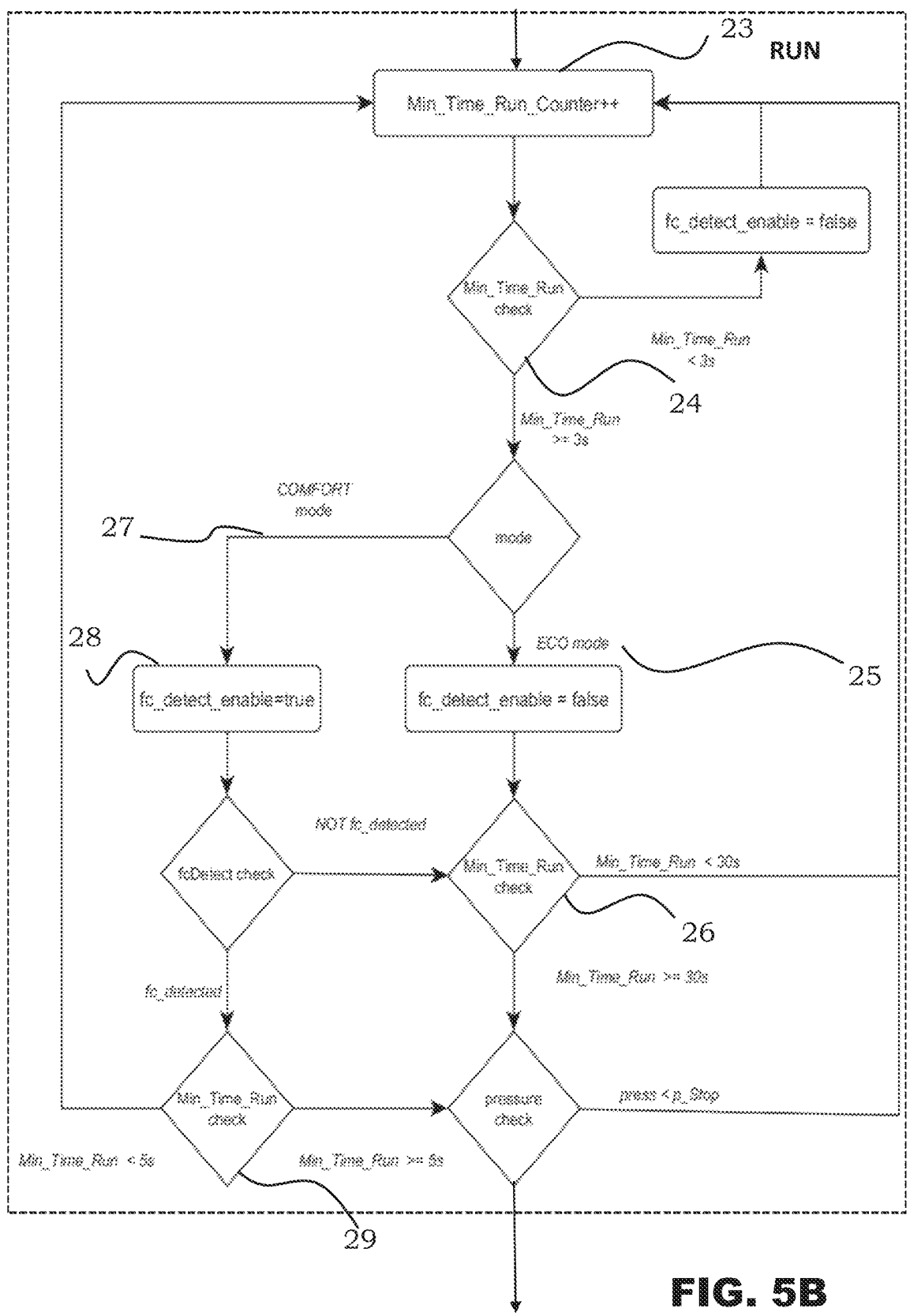

By way of example, FIG. 5 shows a flow chart representative of the method according to the invention for a pressurization system 1 comprising an expansion tank.

After a pressure control step 22, in a pressure condition below the start-up pressure, the method according to the invention is started. The updating of the counter 23, shown in FIG. 2, is followed by a second counter 24 which acts as a timer to measure the operating time of the pressurization system 1. In relation to the operating time and the selected mode, "eco" or "comfort", an algorithm branch is applied.

In the "eco" mode 25 the pressurization system 1 is stopped after 30 seconds, after a verification step 26 that the pressure has not exceeded the stop pressure equal to Hmaxr.

In the "comfort" mode 27 the enabling check is carried out at the closure of the utility 28. If it turns out to be enabled and the event of probable closure of the utility is identified, the pressurization system 1 is stopped after 5 seconds after a second verification step 29 that the pressure did not exceed the stop pressure equal to Hmaxr.

Advantageously, by means of the method according to the invention, it is possible to obtain the flow rate for the control of a pressurization system, by simply measuring a pressure with a pressure sensor positioned at the delivery duct of the pressurization system and once known the electrical variables of the motor, i.e. the current and power absorbed.

Advantageously, the pressure sensor is used to estimate the rotational speed of the impeller of the pressurization system starting from the pressure pulsations in the time unit measured by the pressure sensor at the delivery duct of the pressurization system.

Advantageously, using the sole pressure value, the method according to the invention implemented in the electronic unit of the pressurization system, allows detecting a positive variation of the pressure corresponding to a probable partial or total closure of the utility.

Furthermore, the method according to the invention allows an optimization of energy consumption, while maintaining the maximum use comfort for the utility.

A skilled person will also appreciate how the structural requirements of the system are minimized, with a consequent minimization of costs for the same confidence of data obtained with more complex systems.

The skilled person will understand that the embodiment herein presented may undergo various changes and variants according to contingent and specific needs, all within the scope of protection of the invention, as defined by the following claims.

The invention claimed is:

1. A management and control method for at least one operation parameter of a pressurization system (1) operated by an electric motor (2), the method comprising a preliminary step of storing of nominal operation parameters of said pressurization system (1) in a summary portion of a control electronic unit (4) of said pressurization system (1), and further comprising the steps of:
   detection of an operating pressure value at a delivery duct (8) of said pressurization system (1), by means of a single pressure sensor (10);
   estimation of a hydraulic flow rate and a hydraulic head by means of an algorithm which is implemented in a control software based on said operating pressure value detected by means of said single pressure sensor (10);
   estimation of a motor rotation speed (2) of said pressurization system (1) based on said operating pressure value and on the number of blades (Z) of the impeller of said pressurization system (1);
   processing of an on/off signal of said pressurization system (1) as a result of said estimation;
   wherein said signal processing step comprises an updating step of the value of a nominal hydraulic head of said nominal functional parameters of said pressurization system (1), starting from said operating pressure value and from said motor rotation speed;
   wherein said signal processing step comprises a step of calculating an optimal value of input and suction hydraulic head of said pressurization system (1), within a reference value range;
   wherein said signal processing step comprises a step of calculating a pressure variation between said input and suction hydraulic head and said nominal hydraulic head and of a relative optimization of switch-on time of said pressurization system (1) as a function of said on/off signal;
   wherein said step of calculating an optimal value of an input and suction hydraulic head of said pressurization system (1), comprises the steps of:
   setting of initial pressure parameters of said pressurization system (1);
   calibration of said pressurization system (1) by means of an iterative process of comparison between a weighted difference in operating hydraulic head and a pre-set reference value, said calibration step being repeated after the switching off;
   identification of a value of said reference input and suction hydraulic head and of a minimum energy consumption condition in a pre-set time period.

2. The management and control method according to claim 1, further comprising an iterative repetition for a variable energy optimization of the operation of said pressurization system (1) and for identifying off-design operating conditions of said pressurization system (1).

3. The management and control method according to claim 1, comprising an application of a pre-set comfort parameter to said nominal hydraulic head value and to said input and suction hydraulic head value.

4. The management and control method according to claim 1, further comprising a priming control step of the pressurization system (1).

5. The management and control method according to claim 1, further comprising an estimation step of an expansion tank volumetric capacity according to the operating use conditions of said pressurization system (1), adapted to maintain a pre-set minimum operating threshold of switching-on and switching-off of said pressurization system (1).

6. A pressurization system (1), comprising a single pressure sensor (10) and an electronic control unit (4) adapted to perform a method according to claim 1.

7. The pressurization system (1) according to claim 6, further comprising an electric motor (2) of asynchronous type.

8. The pressurization system (1) according to claim 7, further comprising an expansion tank.

* * * * *